W. C. HARRISON.
Rag-Cutting Machine.
No. 163,069. Patented May 11, 1875.
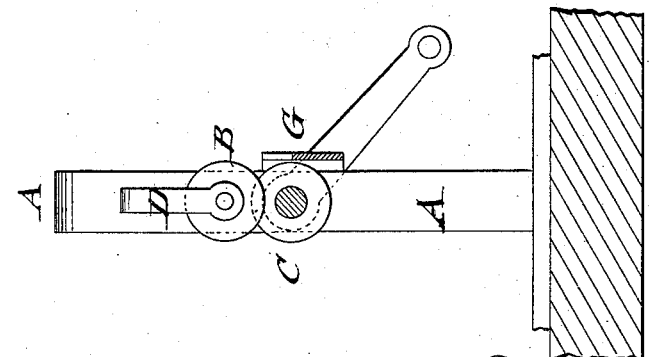
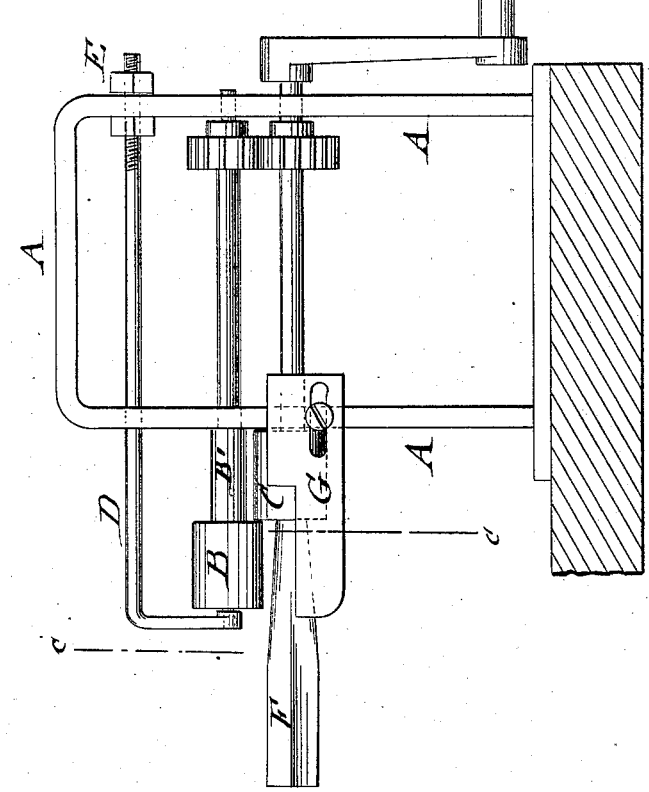

UNITED STATES PATENT OFFICE.

WILLIAM C. HARRISON, OF GOSHEN, NEW YORK.

IMPROVEMENT IN RAG-CUTTING MACHINES.

Specification forming part of Letters Patent No. 163,069, dated May 11, 1875; application filed March 1, 1875.

*To all whom it may concern:*

Be it known that I, WILLIAM C. HARRISON, of Goshen, in the county of Orange and State of New York, have invented a new and Improved Machine for Cutting Rags, of which the following is a specification:

In the accompanying drawing, Figure 1 represents a front elevation of my improved machine for cutting rags to be employed in the manufacture of rag-carpets; and Fig. 2 is an end view of the same, partly in section, on the line *c c*, Fig. 1.

Similar letters of reference indicate corresponding parts.

My invention relates to an improved machine for cutting up waste pieces of cloth, carpets, and other fabrics in a rapid manner into continuous strips or rags to be employed in the manufacture of rag-carpets.

The cutting up of the rags by hand being a very tedious and trying operation, my machine is intended to obviate this and produce the rags at a considerable saving; and it consists of two revolving cutting-rollers, which are adjusted by suitable mechanism in close proximity to each other, to cut the fabric fed thereto by the shearing action of their cutting-edges, an adjustable guide or gage piece regulating the width of the strips, while a square shaft of one roller assists the feeding of the same.

A represents the supporting-frame; B, the upper, and C the lower, cutting-roller. The rollers B and C are keyed outside of frame A to shafts, which are revolved in bearings of frame A by suitable gearing and a hand-crank or other power. The rollers are set edgewise against each other, as shown in Fig. 1, so that their cutting-edges pass slightly over each other, their greater or lesser shearing power being regulated by a suitable tension-spring rod, D, adjusted by screws E of the upper roller, or otherwise.

The pieces of cloth, carpet, or other fabric are stitched together at their ends to form a round continuous piece, and hung to a square extension-shaft, F, of the lower roller, to assist the forward feeding of the fabric between the roller C and a cylindrical pressure or feed roller, B', of the shaft of the upper feed-roller.

A recessed guide-piece or gage, G, is adjusted, by slot and set-screws, to suitable distance from the cutting-edges of the rollers, to regulate the cutting of rags of various widths.

The connected pieces of fabric admit the continuous feeding of the same to the rollers until the whole is cut up into one narrow strip, which is employed as weft in the weaving and manufacture of rag-carpets.

Having thus described my invention, I claim as new and desire to secure by Letters Patent—

The combination of cutting-roll B, feeding-roll B', cutting and feeding roll C, tension-spring rod D, extension-shaft F, and gage G, all arranged and operating together as and for the purpose specified.

WILLIAM CRAMPTON HARRISON.

Witnesses:
TIMOTHY KELLY,
CHARLES G. ELLIOTT.